US007231366B1

(12) United States Patent
Barry (10) Patent No.: US 7,231,366 B1
(45) Date of Patent: Jun. 12, 2007

(54) GLOBAL VENDOR FINANCING SYSTEM AND METHOD

(75) Inventor: John Barry, Lisle, IL (US)

(73) Assignee: Heller Financial, Inc., Chicago, IL (US)

( * ) Notice: Subject to any disclaimer, the term of this patent is extended or adjusted under 35 U.S.C. 154(b) by 1042 days.

(21) Appl. No.: 09/715,958

(22) Filed: Nov. 15, 2000

(51) Int. Cl.
*G06Q 40/00* (2006.01)
(52) U.S. Cl. .......................................... 705/38; 705/35
(58) Field of Classification Search .................. 705/35, 705/38
See application file for complete search history.

(56) References Cited

U.S. PATENT DOCUMENTS

| | | |
|---|---|---|
| 4,799,156 A | 1/1989 | Shavit et al. |
| 5,611,052 A | 3/1997 | Dykstra et al. |
| 5,644,721 A | 7/1997 | Chung et al. |
| 5,710,889 A | 1/1998 | Clark et al. |
| 5,774,883 A | 6/1998 | Andersen et al. |
| 5,794,218 A | 8/1998 | Jennings et al. |
| 5,864,827 A | 1/1999 | Wilson |
| 5,878,403 A | 3/1999 | DeFrancesco et al. |
| 5,890,140 A | 3/1999 | Clark et al. |
| 5,933,816 A * | 8/1999 | Zeanah et al. ................ 705/35 |
| 5,940,812 A | 8/1999 | Tengel et al. |
| 5,963,923 A | 10/1999 | Garber |
| 6,058,378 A | 5/2000 | Clark et al. |
| 6,088,686 A | 7/2000 | Walker et al. |
| 6,823,319 B1 * | 11/2004 | Lynch et al. .................. 705/38 |
| 2001/0037288 A1 | 11/2001 | Bennett et al. |
| 2002/0023051 A1 | 2/2002 | Kunzle et al. |
| 2002/0038284 A1 | 3/2002 | Fukunaga |

FOREIGN PATENT DOCUMENTS

EP 0840244 A1 * 1/1997

OTHER PUBLICATIONS

Grafton, David and Sorice, Ralph. "Trans Union LLC and Data Advantage Limited Announce Joint Partnership to Establish Credit Reporting Services for Asian Countries". Business Editors. Business Wire. New York, NY: Nov. 9, 2000. p. 1.*
International Search Report (5 pgs.) of International Application No.: PCT/US01/44150; Applicant: Heller Financial, Inc.; International Filing Date: Nov. 14, 2001.
.www.lucent.com; (Lucent Technologies Inc.); Newcourt signs expanded vendor financing arrangement with Lucent Technologies; Mar. 11, 1998; (2 pgs.).
.www.monitordaily.com; Conroy, Tim; Global Alliances & Vendor Financing Success is in the Details; Monitor Leasing & Financial Services Mar. 2001, (2 pgs.).
www.asiapac.alcatel.com; (Alcatal Corp.) Alcatel expands innovative global vendor finance securitization; Oct. 12, 2000; (2 pgs.).

* cited by examiner

*Primary Examiner*—Lalita M. Hamilton
(74) *Attorney, Agent, or Firm*—Armstrong Teasdale LLP (57) ABSTRACT

Various aspects of the invention can be found in a method or system of global vendor financing that automatically process vendor financing applications. A vendor financing application is received over a computer network and indicates an asset(s) to be financed and an applicant desiring the asset(s). Credit information is gathered about the applicant and the application is scored and a prices is then determined if the customer qualifies for the vendor financing. The credit information may be gathered from one of a plurality of credit information sources in one or more countries. The method or system of global vendor financing may handling vendor financing applications in multiple languages and multiple currencies. Optionally, the system or method may include push services and workflow management.

52 Claims, 4 Drawing Sheets

GLOBAL VENDOR FINANCING SYSTEM AND METHOD

BACKGROUND OF THE INVENTION

1. Technical Field

The present invention relates generally to a system and method of vendor financing; and more particularly, it relates to a system and method for providing automated global vendor financing.

2. Related Art

A customer may wish to finance an asset, such as a computer, instead of purchasing the asset from the vendor. Some vendors lease assets to such customers. Other vendors provide a vendor financing option to such customers. Traditionally, a vendor financing company receives a credit request from the vendor and processes it manually. Manually processing vendor financing applications is time consuming and expensive. Some vendor financing companies finance assets in only a limited field, such as computer systems, farm equipment, or real estate. Traditional vendor financing companies provide vendor financing in only one country.

SUMMARY

Various aspects of the invention can be found in a method or system of global vendor financing that automatically processes vendor financing applications. A vendor financing application is received over a computer network and indicates an asset(s) to be financed and an applicant desiring the asset(s). Credit information is gathered about the applicant and the application is scored. If the customer qualifies for the vendor financing, a price is determined. The credit information may be gathered from one of a plurality of credit information sources in one or more countries. The method or system of global vendor financing may handle vendor financing applications in multiple languages and multiple currencies. Optionally, the system or method may include push services and workflow management.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The components in the figures are not necessarily to scale, emphasis instead being placed upon illustrating the principles of the invention. Moreover, in the figures, like reference numerals designate corresponding parts throughout the different views.

DETAILED DESCRIPTION OF THE PREFERRED EMBODIMENTS

A customer (applicant) who desires to finance a product offered by a vendor may automatically receive vendor financing via a computer system regardless of which country or countries the applicant is from or the asset to be financed is from. With this vendor financing system and method, the results of the vendor financing application are provided in minutes instead of days. Automated vendor financing may be provided more efficiently and more cost effectively, especially for less expensive assets.

Figure 1:
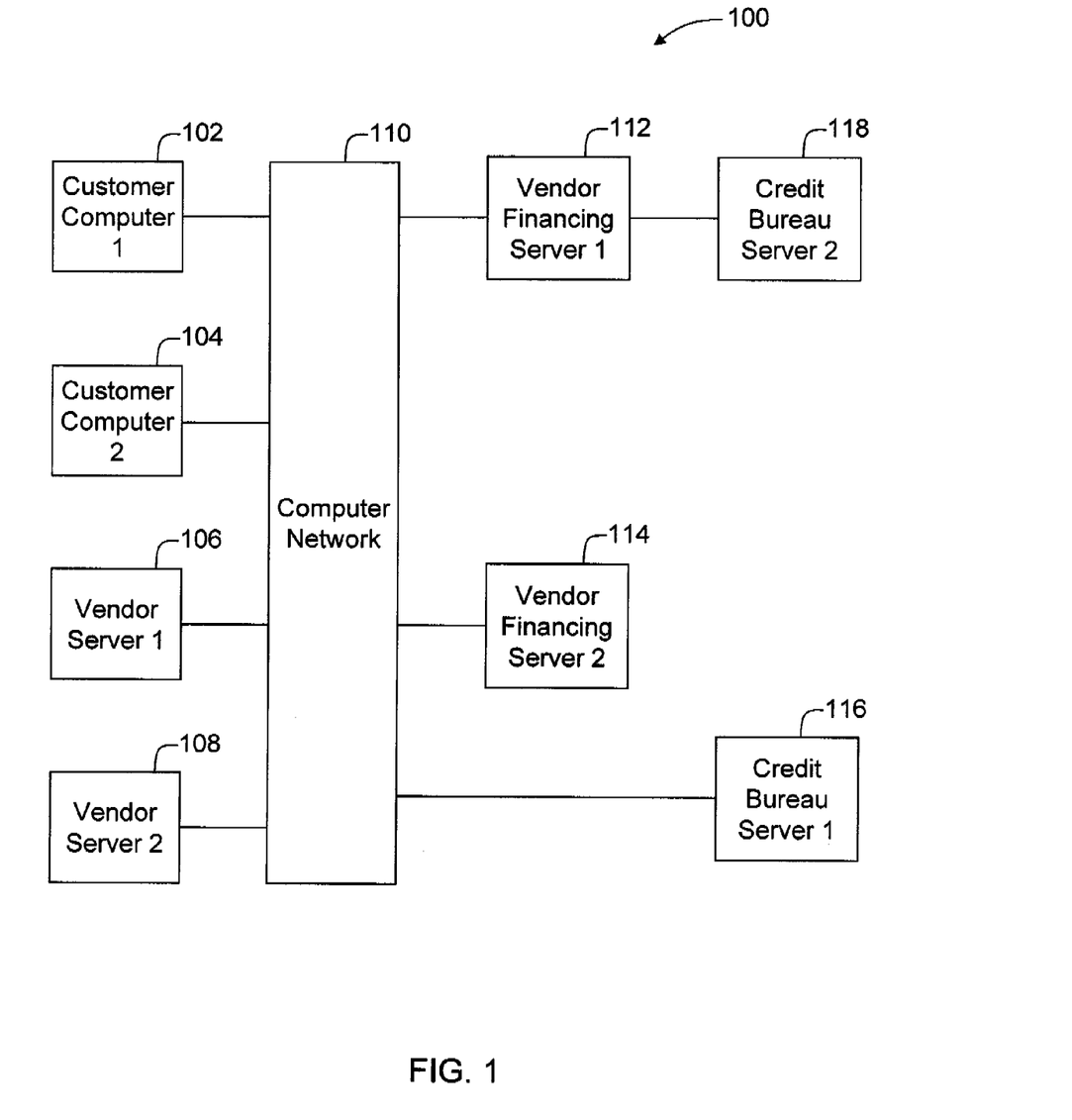
FIG. 1 is a block diagram illustrating an embodiment of a global vendor financing system.

FIG. 1 is a block diagram illustrating an embodiment of a global vendor financing system 100. A customer may use the vendor financing system 100 to acquire vendor financing over a computer network 110. The customer at a customer computer 102 accesses a vendor server (VS) 106 via a computer network 110. The VS 106 may require the customer to log-on to the VS 106 before processing a credit request (credit application). The customer then completes a vendor financing application. The vendor server 106 or the customer computer transmits the complete vendor financing application to a vendor financing server 112 for processing. The vendor financing server 112 determines a credit level for the customer's credit request. To determine the credit level, the vendor financing server 112 may contact one or more credit bureaus 118 to acquire information about the customer. The vendor financing server 112 then determines a price for the vendor financing. One or more documents are then presented to the customer, who may then accept the terms of the vendor financing. The customer may accept the vendor financing by submitting an electronic signature to the vendor financing server. Alternatively, customer may accept the vendor financing by printing the document, signing the document, then sending the document to the vendor. Once the customer accepts the vendor financing, the closing and reporting occur.

The documents may be generated in standard formats, such as PDF, Microsoft Word, or WordPerfect. Also, the global vendor financing system 100 may also support Electronic Data Interchange (EDT) for communication with system that support EDI, for example EDI invoices.

The computer network 104 may be any computer network including an intranet, a virtual private network, the Internet, or another network. A customer may log-on to the vendor server's 106 web page to access the vendor financing application. The vendor server 106 may access a vendor financing server (VFS) 112 to request an application form. The VFS 112 or the VS 106 may select the appropriate application form from a group of application forms. The application forms may include forms such as: a form for capital equipment under $5,000, a form for capital equipment between $5,000 and $100,000, a form for real estate under $100,000, and a form for real estate over $100,000. The VS 106 may have a web site that is a branded, a co-branded, or an affiliated site. A branded web site, also called a private label web site, presents the application form to the customer such that there is no indication that the application form came from the vendor financing server 112. A co-branded web site will indicate both the vendor and the vendor financing company's names. An affiliated site will have a link to the vendor financing companies' site. In one embodiment, the customer computer 102, the vendor server 108, the vendor financing server 112, and the credit bureau server 116 communicate using a secure communication protocol, such as the secure socket layer (SSL) protocol. Optionally, the vendor financing system 100 may by linked to the EDGAR database of corporate information. Various fields in the vendor financing application may be completed by information from the EDGAR database. For example, after the customer enters its company name, the company address and other information may be automatically completed.

The global vendor financing system 100 may have multiple customer computers 102 and 104 located in different countries, displaying information in different languages and different currencies. The customer computer 102 or the vendor server 112 may indicate a language or currency preference by transmitting a country code and/or a language code. In one embodiment, the country code is associated with the geographic location of the customer, product, or vendor. Alternatively, a vendor ID or a customer ID may be associated with a language or currency preference. The customer computers 102 and 104 may communicate with one or more of a variety of vendor websites running on various vendor servers 106 and 108. The vendor servers 106 and 108 may be located in different countries, use different languages, and use different currencies. The vendor servers 106 and 108 may communicate with one or more of a variety of vendor financing servers 112 and 114. The vendor financing servers 112 and 114 may be located in different countries, use different languages, and use different currencies. Thus, a customer in a first country may request vendor financing via a vendor server in a second country, and the request may be processed by a vendor finance server in a third country that accesses credit information in one of three countries or even in a fourth country. The vendor financing servers 112 and 114 may communicate with a credit bureau server 106 over the computer network and another credit bureau server 118 via a direct connection, such as via a modem connect. The credit bureau servers 116 and 118 may be located in different countries, use different languages, and use different currencies. The global vendor financing system 100 may also provide vendor financing in one country where the customer computer 102, the vendor server 112, and the credit bureau 118 reside.

The vendor financing application may seek to finance multiple products or services that are located in different countries. Such a vendor financing application may require evaluating the customer's credit in those countries. Thus, a single vendor financing application may require accessing credit information from credit bureaus in different countries.

Figure 2:
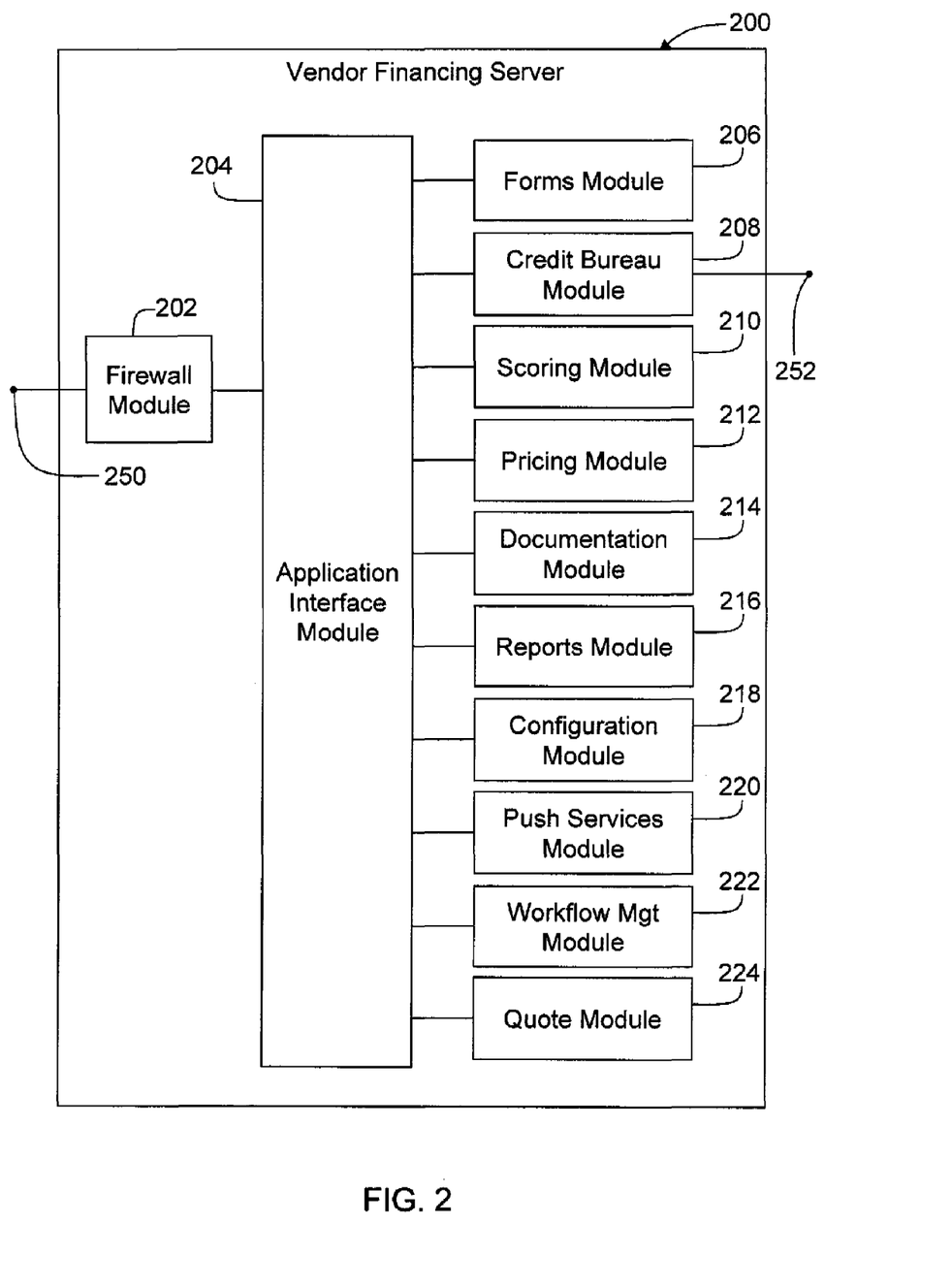
FIG. 2 is a block diagram illustrating an embodiment of a vendor financing server.

FIG. 2 is a block diagram illustrating an embodiment of a vendor financing server 200 capable of being used in the global vendor financing system 100. The vendor financing server 200 includes a variety of software modules 202–224 that perform various operations. In one embodiment, the modules 202–224 are written in an industry standard markup language, such as the XML computer language. The vendor financing server 200 has an optional firewall module 202 to protect unauthorized access to the vendor financing server 200. An input/output node 250 connects the vendor financing server 200 to a computer network 110 (FIG. 1), such as the Internet.

An application interface module 204 controls the other modules 206–224 and provides an interface for communication with customer computers, vendor computers, and credit bureau computers. In another embodiment, the modules 206–224 function without an application interface module 204.

A forms module 206 generates various forms including vendor financing application forms. A form may be tailored to the specific needs of the vendor, customer or the type of transaction. The forms module 206 may transmit the empty form to the vendor and receive the completed form from the vendor. The forms module 206 may generate the various forms in one or more of a variety of languages and currencies.

A credit bureau module 208 communicates with various credit bureaus. The credit bureau module 208 may communicate with a credit bureau over the Internet or over a direct connection, for example a modem connection. The credit bureau module 208 requests credit information about a customer who has requested vendor financing. Optionally, the request is sent automatically after a vendor financing application is received. The credit bureau module 208 then receives a response from the credit bureau containing the requested credit information (credit report). In another embodiment, a request for credit information is transmitted to multiple credit bureaus and multiple responses are received by the credit bureau module 208.

A scoring module 210, also called the credit scoring module, evaluates the vendor financing application and the credit information from the credit bureau and then determines a credit level. In one embodiment, the credit report from the credit bureau is in a predetermined format such that the scoring module 210 may automatically process the credit report. The scoring module 210 may support multiple languages and multiple currencies. Many countries, such as North American countries and many European countries, have sufficient credit information available via computers that a large number of credit applications from those countries may be processed without manual intervention. As more credit agencies in other countries begin to offer reliable on-line credit systems such credit agencies may be integrated with the vendor financing server 200. In one embodiment, the method of scoring is standardized for multiple countries. The scoring module 210 may provide automated residual matrices. In another embodiment, different scoring is provided as a function of country, region, amount of financing, customer or any other variable used for scoring.

A pricing module 212 determines a price for the vendor financing if the amount of credit (credit level) is equal to or exceeds the desired vendor financing amount. The pricing module 212 may use a variety of data sources to determine the price, including: configurable rate cards, residual value matrices, customer history, real-time market conditions, and credit reports. The rate card parameters may be automatically derived from market rate and yield requirements. In one embodiment, the pricing module 212 supports multiple languages and multiple currencies.

Optionally, the pricing module 212 determines a variety of prices for the vendor financing. The various prices may be a function of different financing terms, different asset values, or other factors. The applicant may then select a price.

A documentation module 214 automatically generates the documents for the vendor financing. The documents required for each vendor financing transaction may vary based on the vendor, the program, the asset type, or other factors. In one embodiment, the documents are made available electronically. The electronic documents may be sent to the vendor server or to the customer computer. Alternatively, the documents may reside on the vendor financing server and be retrieved as needed. The documentation module 214 may optionally support electronic signatures for customer acceptance of the terms of the document. In another embodiment, the documents may be printed and mailed to the customer or vendor. The documentation module 214 optionally retains an archive copy of the documents. Tracking and auditing check lists may also be generated by the documentation module 214 to support tracking and auditing requirements. The tracking and auditing check lists may vary for different vendors, programs, assets types, etc. Uniform Commercial Code (UCC) or other statutory documents (VAT, sales, and property documents) may also be generated by the documentation module 214. In one embodiment, document module 214 comprises an integrated document management module that includes document indexing, tracking, viewing, generating, and publishing. The document module 214 may allow attachment of scanned documents with a capability to view the scanned documents on-line. The documentation module 214 may also allow a customer (lessee) to track the status of an application. The customer may request the status of the application and receive an e-mail status or an on-screen status document.

A reports module 216 generates reports that may be sent electronically or printed and mailed. The reports may include origination status reports and effectiveness reports by vendor, program, and marketing group. Market groups may include such groups as enterprise information technologies, industrial products, specialized markets, channel programs, and others. An origination report may summarize origination information, for example, decision ratios, close ratios, deal turnaround statistics, current deal status distributions, credit score distributions, channel usage, and others. Other reports may also be generated, such as vendor statistical reports by region and ad hoc reporting.

A configuration module 218 allows the vendor financing server 200 to be configured without reprogramming. For example, a new private label vendor's web site could be supported by using the configuration module 218 to configure the new web site without the need for or minimal amount of reprogramming the vendor financing server's 200 modules 202–224. Other features that may be configured with the configuration module 218 include rate cards, score cards, required documents, residual matrices, and others.

An optional push services module 220 provides the capability to offer services and products not specifically requested by a customer. For example, the push services module 220 supports direct marketing activities that target applicants and send information or product offers to those applicants. The push services module 220 may provide push services to an applicant with a credit level greater than the requested vendor financing. The push services process is also called "up-sell." For example, if an applicant with a credit level of $30,000 requests vendor financing of $25,000, the push services module target offers to that applicant additional products or services equal to or less than $5,000. The push services module 220 may also offer products or services to former applicants or to non-applicants.

A workflow management module 222 may route work for manual processing if the vendor financing server 100 determines that the vendor financing application cannot be processed automatically. Various criteria and thresholds may be used to identify such an application, for example a financing limit, a credit level, geographic indicia, a credit history factor, a credit score limit, and other criteria.

An optional quote module 224 provides on-line quotes to customers over a computer network. The quote module 224 may be accessed by a vendor's private label web site or the customer may access the vendor financing server 200 directly. The quote module 224 may provide discriminatory pricing by using predetermined criteria such as the customer's history, program, finance amount, or other. In an embodiment, the quote module 224 provides quote refinement if desired. The quote module 224 may be bypassed by the customer if the customer desires to apply for the vendor financing without first receiving a quote.

The global vendor financing system 200 may be designed to include existing software modules, modified versions of existing software modules, and/or new software modules. For example, LeasePak, CRM, Experian-Scorex(Transact), CAS/LMS, SmartDeals, MAXCredit, LeaseHawk/CAS, E-Business Origination, PANCredit and/or LMS/CMS could be integrated into an embodiment of the global vendor financing system 200.

The global vendor financing system 200 may be available 24 hours a day, 7 days a week, 365 days a year. Because the global vendor financing system 200 is automated, applications may be processed in only minutes or even in real-time, where the conventional vendor financing methods require days. The global vendor financing system 200 may be configurable without rewriting the source code. Thus, a new vendor with a branded web site could be linked with the VFS 200 with minimal efforts.

Figure 3:
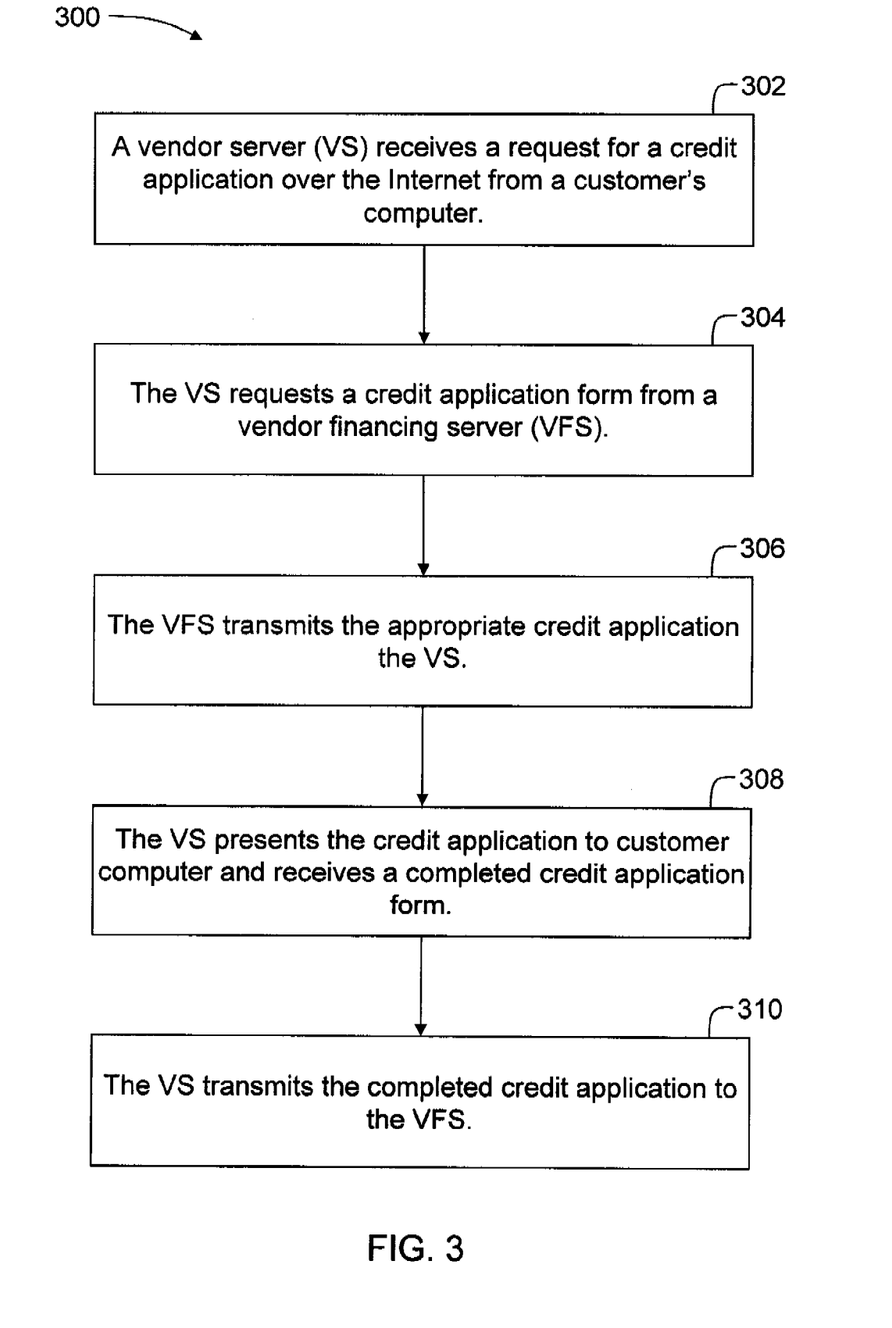
FIG. 3 is a flow diagram illustrating an embodiment of a process for providing vendor financing forms to a branded vendor server.

FIG. 3 is a flow diagram 300 illustrating an embodiment of a process for providing vendor financing forms to a branded vendor server. In 302, a vendor server receives an indication that a potential customer wishes vendor financing. For example, the customer logs onto the vendor server and selects a credit application from a list of application forms. Alternatively, the vendor computer may determine the appropriate form by requiring the customer to select the characteristics of the vendor financing, such as an asset type and an estimated asset value. In another embodiment, the vendor financing server selects the appropriate form.

In 304, the vendor server requests a credit application form from a vendor financing server. The request may include an identifier of the desired credit application, the vendor financing characteristic, or other appropriate indication. In 306, the vendor financing server transmits the appropriate credit application to the vendor server.

In 308, the vendor server presents the credit application to the customer and receives a completed credit application form. In 310, the vendor server transmits the completed credit application to the vendor financing server.

Figure 4:
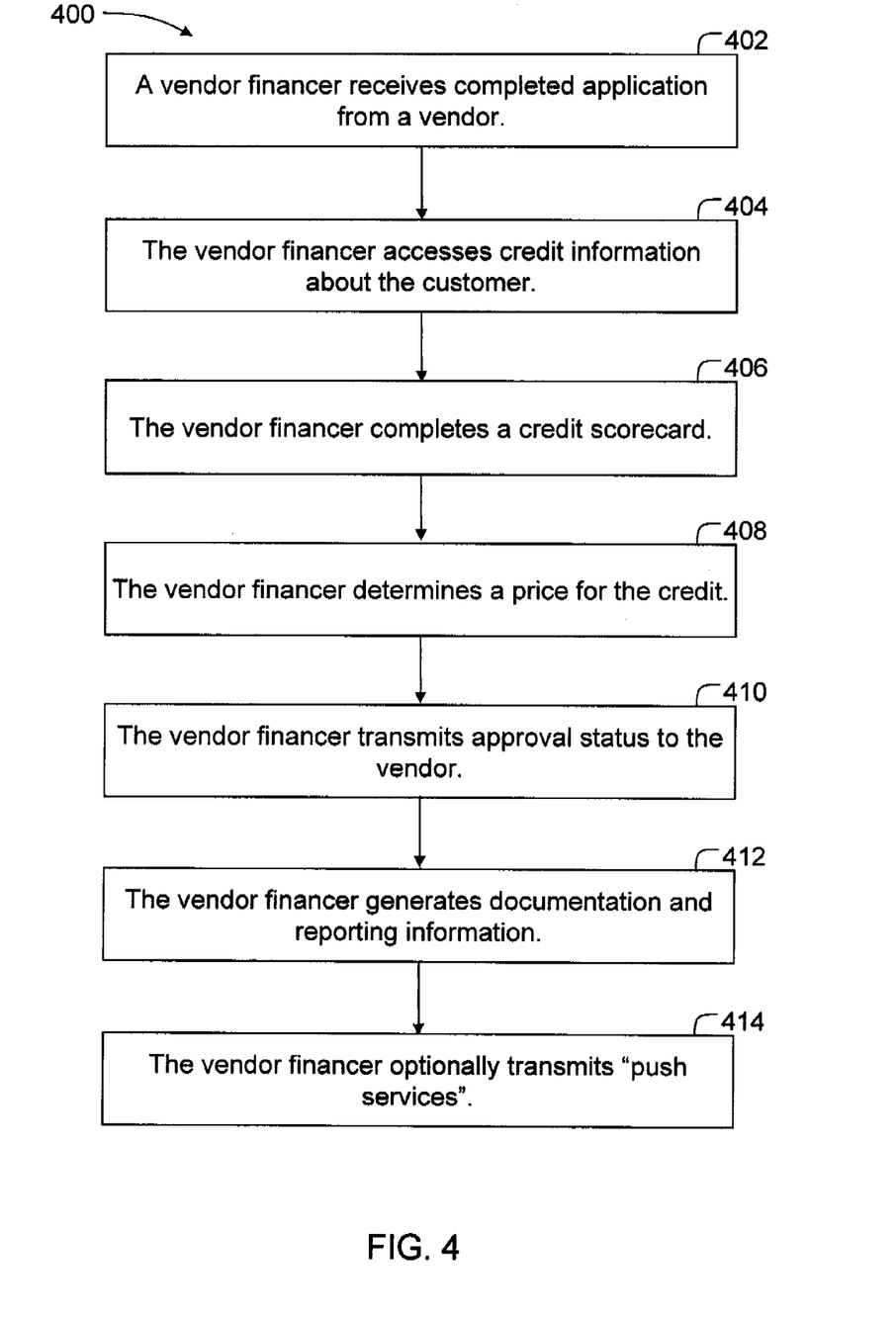
FIG. 4 is a flow diagram illustrating an embodiment of a process of global vendor financing.

FIG. 4 is a flow diagram 400 illustrating an embodiment of a process of global vendor financing. In 402, a vendor financer receives a completed application form from a vendor. The application may be completed by the customer, by the vendor, or a combination thereof. The vendor may complete part or all of the application if the customer telephones, faxes, or mails the information to the vendor. For example, the customer could print a blank vendor financing form and fax the completed form to the vendor. The application may seek to finance one or more assets located in one or more countries. The assets may be in the same or a different country than the customer or the vendor.

In 404, the vendor financer accesses credit information about the customer. The vendor financer may access one or more credit agencies (credit bureaus) or banks to acquire credit information. The various credit agencies may provide credit information from different countries. For example, credit bureaus in the United States include Experian, Equifax, Dun & Bradstreet, Credit Bureau of Sudbury (Canada), UK Data Ltd. (England), MRC Business Information (England—International Maritime Credit Reports), Creditreform Russia (Russia), Credinet (Singapore), Web-Credit (S. Africa) and Trans Union. A credit bureau may service more than one country.

In 406, the vendor financer completes a credit scorecard with the credit information and optionally some of the information from the credit application. The score cards may be configurable and easily updateable.

In 408, the vendor financer determines a price for the credit. Various pricing models may be used to determine the price. Optionally, multiple prices may be generated with respective multiple available vendor financing terms. The price may be generated in one or more of a variety of currencies.

In 410, the vendor financer transmits an approval status to the vendor or directly to the consumer. The approval may contain a maximum amount that may be financed by the customer.

In 412, the vendor financer then generates documentation and reporting information. Such documentation and reporting information may be required for compliance with the laws of one or more countries.

In 414, the vendor financer optionally transmits "push services" information. If the maximum financing level for the customer exceeds the amount the customer wishes to finance, information about various other services or products may be sent to the customer. The push services (up-sell) may include only services or products that the customer is eligible for. For example, services or products at a cost less than the difference between the maximum lease amount and the desired lease amount.

The global vendor financing systems and methods described above are adaptable for financing a variety of products or services. While various embodiments of the invention have been described, it will be apparent to those of ordinary skill in the art that many more embodiments and implementations are possible that are within the scope of this invention. Accordingly, the invention is not to be restricted except in light of the attached claims and their equivalents.

What is claimed is:

1. A global vendor financing server that automatically processes a credit application for a customer, comprising:
   at least one processor for processing computer software, the computer software comprising a plurality of computer-related instructions included within a plurality of modules including a network interface module, a credit bureau interface module, a scoring module, a pricing module, a documentation module, and a push services module, wherein
   the network interface module capable of securely communicating with a vendor computer over a computer network including receiving a credit request from the customer for vendor financing and transmitting a credit level for the credit request;
   the credit bureau interface module capable of communicating with first and second credit bureaus, where the communicating comprises receiving credit information from at least one of the first and second credit bureaus, and where the first and second credit bureaus provide credit information for different countries, the credit information received in a predetermined format from the credit bureaus;
   the scoring module capable of determining a credit level for the customer as a function of the credit request and the credit information, the scoring module receives the credit information in the predetermined format, automatically processes the credit information, and outputs a credit level for the customer;
   the pricing module capable of generating a price for providing the vendor financing requested in the credit request;
   the documentation module capable of generating electronic financing documents including a terms document setting forth terms and conditions of the vendor financing being offered to the customer by the vendor, and audit documents for tracking the vendor financing to satisfy audit requirements; and
   the push services module capable of generating a list of additional products when the determined credit level for the customer exceeds the credit request, the push services module further capable of transmitting the list of additional products to the customer, wherein the list of additional products transmitted including at least one of products and services having a cost equal to or less than the difference between the determined credit level for the customer and the credit request of the customer.

2. The global vendor financing server of claim 1, wherein the computer network comprises an Internet.

3. The global vendor financing server of claim 2, further comprising a forms module capable of generating a different application form for different credit requests.

4. The global vendor financing server of claim 3, wherein the forms module is capable of generating an application form in a plurality of languages, the language of the generated form being based on a vendor identification received from the vendor computer.

5. The global vendor financing server of claim 4, wherein the forms module is capable of generating an application form in a plurality of currencies, the currency based on a vendor identification received from the vendor computer.

6. The global vendor financing server of claim 5, wherein the forms module is capable of generating an application form for a branded vendor Internet site.

7. The global vendor financing, server of claim 5, wherein the credit bureau module is capable of communicating with the first credit bureau via the Internet and the second credit bureau via a direct connection.

8. The global vendor financing server of claim 5, wherein the credit bureau module is capable of communicating with both the first and second credit bureaus about the same credit request.

9. The global vendor financing server of claim 5, wherein the scoring module uses configurable score cards to determine the credit level.

10. The global vendor financing server of claim 9, wherein the scoring module comprises different scoring mechanisms for different countries based on a country code received from the vendor computer.

11. The global vendor financing server of claim 9, wherein the pricing module generates the price using configurable rate cards.

12. The global vendor financing server of claim 11, wherein:
   the pricing module generates a plurality of prices for providing the vendor financing requested in the credit request, where each price is generated with a different financing term; and
   the documentation module generates a terms document for each of the plurality of prices generated by the pricing module, each terms document sets forth terms and conditions of the vendor financing including the corresponding price being offered to the customer by the vendor.

13. The global vendor financing server of claim 11, wherein the pricing module generates a price as a function of a country code indicating a country where a financed product resides.

14. The global vendor financing server of claim 11, wherein the pricing module generates a price a function of a country code indicating a country where the vendor computer is located.

15. The global vendor financing server of claim 11, further comprising:
   a workflow management module capable of routing a credit request for manual processing.

16. The global vendor financing server of claim 1, wherein the list of additional products comprises only products available for less than a difference between the credit level and the credit request.

17. The global vendor financing server of claim 1, further comprising:
   a documentation module capable of generating electronic financing documents.

18. The global vendor financing server of claim 17, wherein the documentation module is capable of receiving electronic signatures.

19. The global vendor financing server of claim 18, wherein the documentation module automatically generates a UCC document for each credit request for credit in the United States.

20. The global vendor financing server of claim 1, further comprising an interactive quote module capable of providing a price quote before the credit request is received.

21. The global vendor financing server of claim 1, where the credit request comprises a request for financing for multiple products.

22. The global vendor financing server of claim 21, wherein the multiple products comprise products purchased in different currencies.

23. The global vendor financing server of claim 22, wherein the multiple products comprise products located in the countries.

24. A method of automatically processing a vendor financing credit application in a global vendor finance computer, comprises:
   receiving a vendor financing credit application via a computer network from a vendor computer, where the vendor financing credit application indicates at least an asset to be financed as part of a vendor financing, an entity desiring the asset and a vendor offering the asset;
   transmitting a first credit request to a first credit agency, where the first credit request indicates at least the entity and the first credit agency is selected from a plurality of credit agencies that provide credit information for different countries;
   receiving a first credit response from the first credit agency indicating credit information of the entity, the first credit response received in a predetermined format from the first credit agency;
   generating a first credit level as a function of the first credit response and the vendor financing credit application, wherein the generating a first credit level includes receiving the first credit response in the predetermined format, automatically processing the first credit response, and outputting a first credit level for the customer;
   generating a price for providing the vendor financing as a function of the first credit level and the vendor financing credit application;
   generating electronic financing documents including a terms document setting forth terms and conditions of the vendor financing being offered to the entity by the vendor, and audit documents for tracking the vendor financing to satisfy audit requirements;
   generating a list of additional products when the first credit level for the entity exceeds the first credit request; and
   transmitting the list of additional products to the entity for consideration by the entity, wherein the list of additional products transmitted including at least one of products and services having a cost equal to or less than the difference between the first credit level for the entity and the first credit request of the entity.

25. The method of claim 24, further comprising transmitting an empty vendor financing application to the vendor computer.

26. The method of claim 25, wherein the receiving comprises receiving a completed vendor financing application from a private label vendor computer.

27. The method of claim 25, wherein the transmitting an empty vendor financing application comprises generating the empty vendor financing application in one of a plurality of languages based on a language identification received from the vendor computer.

28. The method of claim 27, wherein the language identification is specific to the entity.

29. The method of claim 24, wherein the generating the price comprises generating the price in one of a plurality of currencies based on a currency code received from the vendor computer.

30. The method of claim 24, wherein the receiving a first credit response comprises receiving the first credit response via an Internet connection.

31. The method of claim 24, further comprising:
   transmitting a second credit request to a second credit agency, where the credit request indicates at least the entity, where the first and second credit agency provide credit information for different countries;
   receiving a second credit response from the second credit agency indicating credit information of the entity;
   generating a second credit level based in part on the second credit response and the vendor financing application; and
   generating a price as a function of the first and second credit levels and the vendor financing application.

32. The method of claim 24, wherein generating the first credit level comprises using configurable score cards to determine the first credit level.

33. The method of claim 32, wherein the generating comprises using a country specific score card to determine the first credit level, where the country specific score card is selected based on a country code received from the vendor computer.

34. The method of claim 24, wherein the generating a price comprises generating the price using configurable rate cards.

35. The method of claim 34, wherein the generating the price comprises generating the price based in part on a country code indicating a country of the asset.

36. The method of claim 34, wherein the generating a price comprises:
   generating a plurality of prices for providing the vendor financing requested in the credit request, where each price is generated with a different financing term; and
   generating a terms document for each of the plurality of prices generated, each terms document sets forth terms and conditions of the vendor financing including the corresponding price being offered to the entity by the vendor.

37. The method of claim 34, wherein the generating a price comprises generating a price as a function of a country code indicating a country where the vendor computer is located.

38. The method of claim 34, wherein the generating a price comprises generating a price as a function of real-time financial market conditions.

39. The method of claim 24, further comprising:
routing the credit request for manual processing if the credit request exceeds a threshold.

40. The method of claim 24, further comprising:
transmitting an offer for an additional service if the credit level exceeds the credit request.

41. The method of claim 24, wherein the transmitting an offer for additional services that cost less then a difference between the credit level and the credit request.

42. The method of claim 24, further comprising: generating a closing document that includes the price.

43. The method of claim 42, wherein the documentation module automatically generates a UCC document.

44. The method of claim 43, further comprising:
receiving electronic signatures indicating acceptance of the price.

45. The method of claim 24, further comprising: providing a price quote before the credit request is received.

46. The method of claim 24, where the credit request comprises a request for financing multiple products.

47. The method of claim 46, where the multiple products comprise products purchased in different currencies.

48. The method of claim 24, further comprising identifying the credit request for securitization.

49. The method of claim 24, where the credit request the receiving the vendor financing application comprises being in communication with the vendor server with a secure communication method.

50. A method of marketing financial services using a vendor financing computer system, comprising:
receiving a vendor financing application via a computer network from a vendor computer, where the vendor financing application indicates at least an asset to be financed as part of a vendor financing, a customer desiring the asset and a vendor offering the asset;
transmitting a credit request to a credit agency wherein the credit request indicates at least the customer and a requested credit level, the first credit agency is selected from a plurality of credit agencies that provide credit information for different countries;
receiving a credit response from the credit agency indicating credit information of the customer, the credit response received in a predetermined format from the credit agency;
generating a credit limit as a function of the credit response and the vendor financing application, wherein the generating a credit limit includes receiving the credit response in the predetermined format, automatically processing the credit response, and outputting a credit limit for the customer;
generating a price for providing the vendor financing as a function of the credit limit and the vendor financing application;
determining a difference between the credit limit and the requested credit level of the vendor financing customer;
providing an offer for a financial service to the customer via the computer system if the credit limit exceeds the requested credit level, where the financial service costs less than the difference, the offer is provided by using the computer to generate financing documents including a terms document setting forth terms and conditions of the vendor financing being offered to the customer by the vendor; and
generating origination status reports including origination information summaries, current deal status distributions, credit score distributions, and effectiveness reports categorized by at least one of a vendor, a program and a marketing group.

51. The method of claim 50, wherein the providing comprises providing an offer for a plurality of financial service that are each available for less than the difference.

52. A global vendor financing server that automatically processes a credit application for a customer, comprising:
a network interface module configured to securely communicate with a vendor computer over a computer network including receiving a credit request from the customer for vendor financing and transmitting a credit level for the credit request;
a credit bureau interface module configured to communicate with first and second credit bureaus, where the communicating comprises receiving credit information from at least one of the first and second credit bureaus, and where the first and second credit bureaus provide credit information for different countries, the credit information received in a predetermined format from the credit bureaus;
a scoring module configured to determine a credit level for the customer as a function of the credit request and the credit information, the scoring module receives the credit information in the predetermined format, automatically processes the credit information, and outputs a credit level for the customer;
a pricing module configured to generate a plurality of prices for providing the vendor financing requested in the credit request, wherein each price is generated with a different financing term;
a documentation module configured to generate electronic financing documents for each of the plurality of prices generated by the pricing module including a terms document setting forth terms and conditions of the vendor financing including the corresponding price being offered to the customer by the vendor, and audit documents for tracking the vendor financing accepted by the customer for satisfying audit requirements;
a push services module configured to generate a list of additional products when the determined credit level for the customer exceeds the credit request, the push services module further configured to communicate the list of additional products to the customer, wherein the list of additional products transmitted including at least one of products and services having a cost equal to or less than the difference between the determined credit level for the customer and the credit request of the customer; and
a reports module configured to generate origination status reports including origination information summaries, current deal status distributions, credit score distributions, and effectiveness reports categorized by at least one of a vendor, a program and a marketing group.

* * * * *

UNITED STATES PATENT AND TRADEMARK OFFICE
CERTIFICATE OF CORRECTION

| | | |
|---|---|---|
| PATENT NO. | : 7,231,366 B1 | Page 1 of 1 |
| APPLICATION NO. | : 09/715958 | |
| DATED | : June 12, 2007 | |
| INVENTOR(S) | : Barry | |

It is certified that error appears in the above-identified patent and that said Letters Patent is hereby corrected as shown below:

In the Specification, column 2, line 41, delete "EDT" and insert therefor -- EDI --.

Signed and Sealed this

Twenty-sixth Day of May, 2009

JOHN DOLL
*Acting Director of the United States Patent and Trademark Office*